Figure 1:
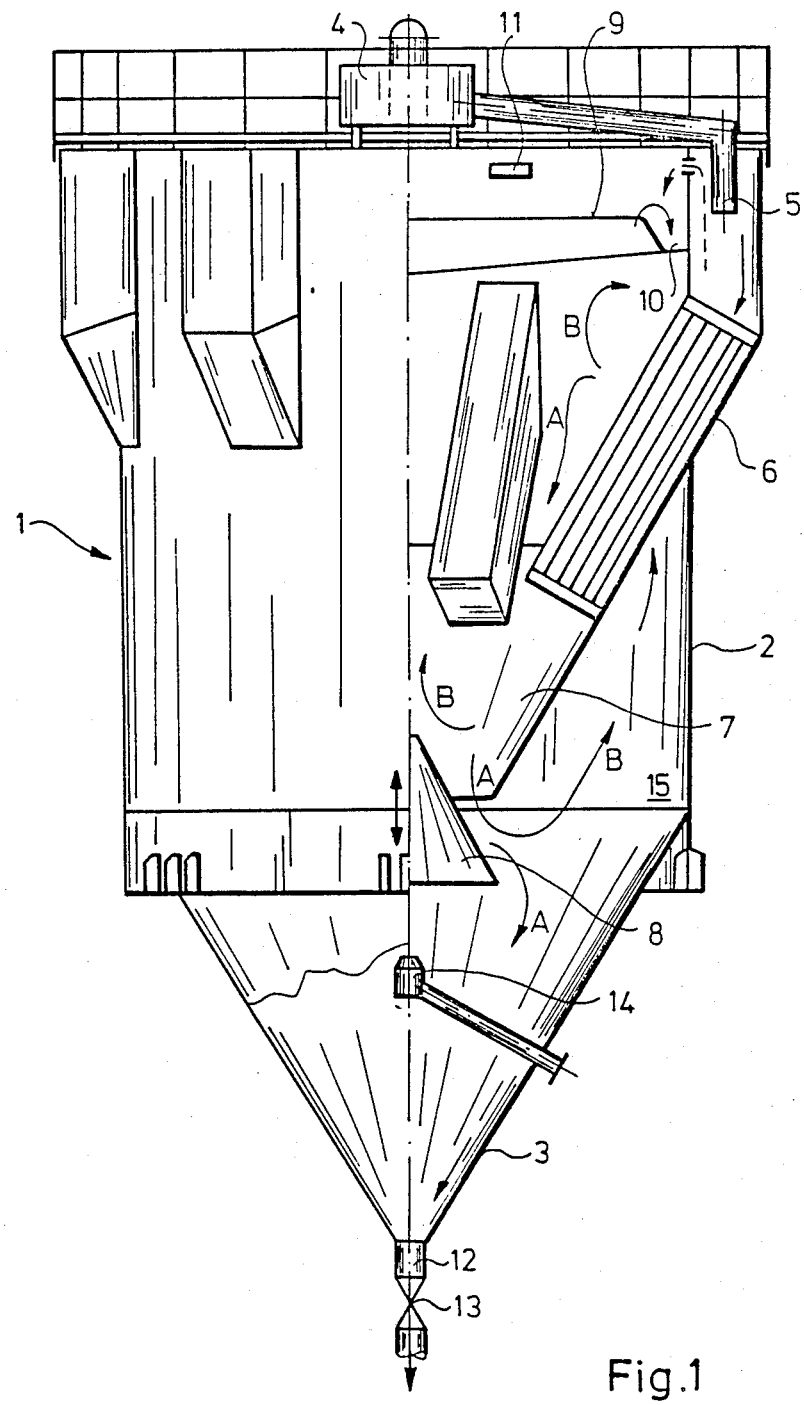

United States Patent [19]

Odor et al.

[11] Patent Number: 4,816,142
[45] Date of Patent: Mar. 28, 1989

[54] PROCESS AND APPARATUS FOR GRAIN-SIZING IN ALUMINA HYDRATE SLURRY

[75] Inventors: Gyula Ódor; Frigyes Csapó; Béla Szabó; Lajos Szücs, All of Mosonmagyaróvár; Mihaly Marton; Jánso Steiner, Both of Budapest; László Révész, Almásfüzitö; Ferenc Tóth, Almásfüzitö; Ferenc Weiszengruber, Almásfüzitö, all of Hungary

[73] Assignee: Magyar Aluminiumipari Troszt, Hungary

[21] Appl. No.: 7,122

[22] Filed: Jan. 27, 1987

[30] Foreign Application Priority Data

Apr. 1, 1985 [HU] Hungary ............... 1222/85

[51] Int. Cl.⁴ ............................................. B03B 5/62
[52] U.S. Cl. ........................................ 209/3; 209/158; 209/160; 55/159
[58] Field of Search ............... 209/13, 3, 17, 4, 18, 209/158, 159, 160, 161, 157, 461; 55/159, 199

[56] References Cited

U.S. PATENT DOCUMENTS

| | | | |
|---|---|---|---|
| 241,239 | 5/1881 | Rouse | 209/160 |
| 247,549 | 9/1881 | Eschweiler | 209/461 |
| 655,125 | 7/1900 | Stalcup | 209/161 |
| 801,200 | 10/1905 | Bailey | 209/161 |
| 975,971 | 11/1910 | Malclus | 209/160 |
| 1,953,672 | 4/1934 | Daman | 209/161 |
| 2,906,401 | 9/1959 | Katz | 209/159 |
| 3,295,677 | 1/1967 | Condolios | 209/157 |
| 4,038,178 | 7/1977 | Hukki | 209/161 |
| 4,332,592 | 6/1982 | Müller | 209/159 |

FOREIGN PATENT DOCUMENTS

| | | | |
|---|---|---|---|
| 163295 | 4/1971 | Hungary . | |
| 165164 | 1/1974 | Hungary . | |
| 180989 | 8/1982 | Hungary . | |
| 582807 | 12/1977 | U.S.S.R. | 209/158 |
| 831203 | 5/1981 | U.S.S.R. | 209/13 |
| 1154070 | 6/1969 | United Kingdom . | |

*Primary Examiner*—David L. Lacey
*Assistant Examiner*—Thomas M. Lithgon
*Attorney, Agent, or Firm*—Handal & Morofsky

[57] ABSTRACT

According to the invention, the grains of the hydrate slurry are separated by sedimentation where the dispersed bubbles of air are removed in course of the presizing, then a supplementary sizing is carried out. Preferably, a liquid free from hydrate grains is fed in to stream against the sinking grains. This liquid is advantageously the spent liquor of the hydrate filter. The apparatus according to the invention consists of a container with conical bottom, a feeding device, a slurry outlet stub and an overflow channel. The inlet stubs of the feeding device, however, are placed off-center and every stub is connected with a presizing equipment. This equipment is composed of a bundle of pipes and/or a pack of plates which are slop placed to geometrical axis: At the upper part of the presizing equipment there is a foam overflow apparatus. The bottom of each presizing equipment is connected with a common cone-frustum type deflector casing. The casing is concentric with the container. There is ring shape gap between the upper edge of the deflector casing and the cylinder jacket of the container. Under the deflector casing there is an upwards convex control cone. The control cone is vertically adjustable and concentric with the deflector casing.

12 Claims, 1 Drawing Sheet

PROCESS AND APPARATUS FOR GRAIN-SIZING IN ALUMINA HYDRATE SLURRY

The invention relates to a process and an apparatus for sizing the grains in alumina hydrate slurries especially those deriving from the precipitators of the alumina production cycle.

The most common method applied in alumina production is the Bayer method. In this case the size of hydrate grains deriving from the precipitating system is in the range from 0 to 250 micron. We remark that the term "hydrate" is used in the sense "alumina hydrate" in this specification.

According to the technology of the alumina production the grains should be separated into two parts where the smaller ones are applied in the next period as inoculating crystals. These are the centre of the crystallization. The greater crystals are filtered and calcined obtaining the alumina.

Several procedures and apparatus are known for sizing the hydrate slurry. The so called steep conical hydroseparator is the best known one. This is a vertical cylindrical container connected with a conical section at the lower bottom. On the top edge there is an overflow channel while at the bottom there is a slurry outlet stub.

It is known that in a given liquid the find sedimentation rate of the grains of a given material depends on the grain size and shape. Should this final sedimentation rate be smaller or greater than the speed of the upward streaming liquid, so the grains will come up or sink. The upward going grains get into the overflow channel while the sinking ones into the conical bottom section. In the course of the operation the fresh slurry comes into the container through an inlet tube and streams downward. But, as the slurry outlet stub allows only a smaller flow rate than the inlet tube, a part of the liquid streams upward to the overflow flange. This way the grains of greater size sediment in the conical and leave through the slurry outlet stub while the smaller ones leave through the overflow channel.

Besides its advantages the hydroseparator has a few principal disadvantages. One of the greatest disadvantages is the significant demand of place.

Further disadvantage is that air is absorbed as a result of filling, air mixing and pumping. Because of the flotation effect this air disturb the sedimentation and this way the sizing. The major share of the small air bubbles sticks to the hydrate grains and because of the lift force, streams upward in the sizing apparatus, resulting therein an intensive foaming.

Several experiments have been carried out in order to stop the foaming. One of these solutions applies different feeders. So a feeding equipment that twirls the material, was tried. In another case the apparatus was equipped with a ring duct for the air to prevent the foaming. None of these attempts gave satisfactory result, the bubbles remained in the system disturbing the sedimentation. Consequently, a little or no progress is attained in the improvement of the efficiency of sizing by these systems. The U.S. Pat. No. 4,038,178 describes an apparatus equipped with stirrer. The foaming did not cease in this case, either and because of the moving components the lifetime of the apparatus decreased and because of the agressive and abrasive character of the alumina hydrate the demand of service increased.

The above setback initiated new trials. This way some of the settlers known in the field of sewage purification were tried as grain-sizer, for example, as in Hungarian Patent specifications Nos. 163.295, 165.164 and 180.989 and U.K. patent specification No. 1.154.070. The experiments proved that these apparatus could not serve as sizer even at low loading, because of the air, absorbed in the slurry.

Also a very important factor, that all the above apparatus can size sufficiently only if the solid substance content is below 400–450 g/l that means that the hydrate slurry should be diluted strongly to obtain any result.

The object of the present invention is a procedure and an apparatus for solving the above problems, improving the effectivity of the sizing of the hydrate slurry, i.e. avoiding the disturbing effect of air bubbles.

Our further aim was to attain an effective sizing without significant dilution of the hydrate slurry produced in the precipitation process. This way the alumina production will be more economical.

According to the invention, the grains of the hydrate slurry are separated by sedimentation where the dispersed bubbles of air are removed in course of the presizing, then a supplementary sizing is carried out.

Preferably, a liquid free from hydrate grains is fed in to stream against the sinking grains. This liquid is advantageously the spent liquor of the hydrate filter.

Similarly to the hydroseparators, the apparatus according to the invention consists of a container with conical bottom, a feeding means, a slurry outlet stub and an overflow channel. The inlet stubs of the feeding means, however, are placed off-centre and every stub is connected with a presizing equipment or liquid degassing means. This equipment is composed of a bundle of pipes and/or a pack of plates which are slop placed to geometrical axis: at the upper part of the presizing equipment there is a foam overflow means. The bottom of each presizing equipment is connected with a common cone-frustum type deflector casing. The casing is concentric with the container. There is ring shape gap between the upper edge of the deflector casing and the cylinder jacket of the container. Under the deflector casing there is an upwards convex control cone. The control cone is vertically adjustable and concentric with the deflector casing.

In the conical part of the container a liquid feeder is placed in the centre. This feeder is advantageously a ring tube with holes.

The inlet stubs are preferably connected with a central distributor and together with the upper part of the presizers are placed outside of the cylindrical jacket of the container.

The bundle of pipes and/or the pack of plates is at 30°–80° angles to the horizontal. The principle of the invention is that the number of collision increases as a result of the power impulses exerted on the dispersed air and hydrate grains so that the dispersed air separates from the hydrate grains, if the sizing procedure is carried out in bundles of pipes and packs of plates, respectively, built together with a hydroseparator.

Because of the cone effect the concentration of the slurry deriving from the presizing equipment grows continuously. The smaller is the cross section of the output the greater is the output concentration. This is the reason why the vertically adjustable cone is built in the apparatus according to the invention. This means that the method according to the invention enables to improve the sizing efficiency, by resulting an efficient separation of grains and air bubbles.

The further details of the invention are shown by a drawing.

The drawing shows the cut section of one form of the apparatus.

The apparatus on the drawing contains a container 1 with an upper cylindrical sector 2 and a conical mud collector 3 placed below. The hydrate slurry comes in through the central distributor 4. From here the material is furthered to the inlet stubs 5. In the present variant of the apparatus the inlet stubs 5 are placed by equal sections along the shell of the container 1 and they are connected with the presizer equipments 6.

The presizers equipments 6 contain a wavy pack of lamellas which is at an angle of 30°-80° to the horizontal. The upper part of the presizer equipments 6 is placed outside of the container, the lower part is placed inside, facing with the conical mud collector 3. The lower part of the presizer equipments 6 is connected with a cone-frustum type deflector casing 7. The casing is concentric with the cylindrical part 2 of the container 1. A control cone 8 is placed below the deflector casing 7 and also the cone is concentric with the cylindrical part 2 of the container 1. The vertical position of the control-cone 8 is adjustable by an equipment not shown on the drawing.

At the upper part of the container 1 inside there is an overflow flange 9 which forms also the edge of the collector channel 10. The bottom of the collector channel 10 is sloping. Above the collector channel 10 in the wall of the cylindrical part 2 of the container 1 there are openings 11 for outlet of foam. These openings 11 form connection between the collector channel 10 and the intervals between the inlet stubs 5 and the presizer equipments 6.

The conical mud collector 3 at the bottom of the container 1 is equipped with mud outlet stub 12, connected with a control valve 13.

At the upper part of the conical mud collector 3 a ring tube 14 is placed serving for the input of liquid. The ring tube is perforated on the upper part.

The shown apparatus contains presizer equipments 6 placed between the inlet stubs 5 and the container 1. Inside the container the presizer equipments 6 are connected with a deflector casing 7. Between the inner surface of the container 1 and outer surface of the casing there is a ring gap. This way a post-sizing section 15 is formed between the deflector casing 6 and the wall of the cylindrical part 2 of the container 1, improving the efficiency of the sizing.

The hydrate slurry comes in through the central distributor 4 with the help of the symmetrically placed inlet stubs 5 the slurry reaches the presizer equipments 6 where it streams downward slowly between the lamellas, while the air bubbles leave the system upward. The foam collected above the presizer equipments 6 leaves through the openings for outlet of foam 11 in the direction marked with dotted arrow. Meanwhile the greater grains sediment in the valleys of the lamellas and slip down to the place below the presizer equipments 6 surrounded by the deflector casing 7.

The grains of slurry streaming from the presizer equipments 6 drift inside the deflector casing 7 and their heavier part sinks in the direction of arrow A while the lighter grains stream upward in the direction of arrow B. The heavier grains get through the throat between the control cone 8 and the deflector casing 7, where the heavy grains sink on to the conical mud collector 3 in the direction of arrow A. The light grains temporarily taken by the heavier ones stream again upward in the post-sizing section 15 placed between the deflector casing 7 and cylindrical part 2 of the container, in the direction of the arrow B.

The sizing in the post-sizing section 15 can be improved by the liquid let in through the ring tube 14. In the present case the liquid is a spent liquor from the hydrate filter.

The heavier ones of the upward streaming grains sink back to the sector of the deflector casing 7 while the lighter ones go upward through the overflow flange 9 and leave through the collecter channel 10. The sinking grains go through the throat again leave upward or downward depending on their weights.

The diameter of the throat should be adjusted so that a significant enhance of concentration difference is obtained between the output concentration at the throat and the concentration at the second stage i.e. the so called "conus-concentration". This way an amount of mother liquor corresponding to the increase of concentration releases in the second stage inducing a stream along the superficies in the direction of the overflow flange. This streaming has a low speed at an even distribution of velocity, it is able to select the little grains from the slurry and to transport to the overflow channel.

The further details of the invention are described in the following examples.

EXAMPLE 1

Hydrate slurry deriving from the precipitator was fed into the apparatus according to the invention. The solid material content of the suspension was 700 g/l, the liquid phase contained 140 g/l of $Na_2O$ and 70 g/l of $Al_2O_3$ in dissolved form. The density was 1,24 kg/dm³. The particle size of the suspended grains in slurry:

| over 45 μm | 35% |
|---|---|
| under 45 μm | 65% |

An intensive foam was observed at the feeder, while in the sizing section practically no foaming was observed. Spent liquor deriving from the hydrate filter was fed throught the ring tube into the post-sizing section. The quantity of the liquor related to the hydrate slurry was 0,02 m³/m³.

The solid material concentration in the conical section of the post-sizing section was 950 g/l. The granulometric assay produced the following results:

| over 45 μm | 70% |
|---|---|
| under 45 μm | 30% |

The solid material concentration in the overflow was 590 g/l. The distribution of the grains:

| over 45 μm | 10,5% |
|---|---|
| under 45 μm | 89,5% |

The 69,6% of the slurry leaved through the overflow while the 30,4% through the conical section. It can be calculated that the overflow contained the 80,8% of the grains under 45 μm, while the conical section contained the 82,6% of the grains over 45 μm.

EXAMPLE 2

Hydrate slurry deriving from the precipitator with 379 g/l solid material content was fed.

In the liquid phase 125 g/l Na$_2$O and 63 g/l Al$_2$O$_3$ were dissolved. The density of the slurry was 1,23 kg/dm$^3$. The composition of slurry according to the grain size:

| | |
|---|---|
| over 70 μm | 39% |
| 70 to 40 μm | 27% |
| under 40 μm | 34% |

In the feeder a significant foaming was observed while in the post-sizing section foaming was not observed. 0,15 m$^3$/m$^3$ filtrate water deriving from the hydrate filter was fed through the ring tube in the post-sizing section.

The concentration in the conical part of the post-sizing section was 739 g/l. The composition according to the grain size:

| | |
|---|---|
| over 70 μm | 55% |
| 70 to 40 μm | 27% |
| under 40 μm | 18% |

The solid material content in the overflow was 276 g/l. The granulometric assay produced the following:

| | |
|---|---|
| over 70 μm | 26% |
| 70 to 40 μm | 28% |
| under 40 μm | 46% |

The above examples demonstrated that the sizing according to the invention produced significantly better results than the methods known until now: from the slurry fed in at least 60% of the grains over 70 μm leave through the mud outlet stub, at least 70% of the grains under 40 μm leave through the overflow flange and the overflow channel.

Additional advantage of the invention that the sizing is possible without the dilution of slurry.

The principle of the invention is that the air bubbles dispersed in the hydrate slurry are separated already in the presizing section and the bubbles can leave through the overflow channel causing not any disturbance in the sizing.

Comparing with the recent apparatus the basic advantage of the apparatus according to the invention is the less demand of place, which is a very important factor in case of building of new alumina factories. The handling of the apparatus is very simple and with help of the control elements built in the feeding system and the mud outlet system efficiency of sizing is optimally adjustable.

Various modifications in the structure or steps and/or function may be made to the disclosed embodiments by one skilled in the art without departing from the scope of the invention as defined by the claims.

We claim:

1. Apparatus for sizing of grains in hydrate slurry comprising:
   an upright cylindrical container having at the upper end thereof opening means for the outlet of foam and fine sized grains and connected at the lower end thereof is a downwardly converging conical mud collector and a slurry outlet stub for the outlet of coarse sized grains;
   the container including an inlet feed system means for feeding said grains in hydrate slurry, said feed system means being located at the top of the cylindrical container and having a plurality of inlet stubs spaced from the geometrical axis of the container, each inlet stub being connected with a liquid degassing means, the liquid degassing means comprising at least one of a bundle of pipes or packs of plates disposed at an angle to the geometrical axis of the container, the liquid degasser means is connected at a bottom part thereof to the upper end of a deflector casing, the casing is located inside said cylindrical container and comprises a frustum of a downwardly converging cone having an axis concentric with the container geometric axis, and having upper and lower open ends, the degassing means being connected to the foam outlet;
   said deflector casing having its upper end spaced from said cylindrical container to define a ring gap therebetween;
   a downwardly diverging convex control cone means having an axis concentric with the container geometric axis and having its upper end located partially in the casing lower open end to define a throat therebetween; and
   means to vertically adjust said control cone along the cones axis to thereby control the throat size.

2. The apparatus as claimed in claim 1, wherein a central liquid inlet means is located in the concial mud collector for supplying liquid upwardly toward said casing and control cone means.

3. The apparatus as claimed in claim 2, wherein the liquid inlet means is a ring tube having holes.

4. The apparatus as claimed in claim 1, wherein the feeding system includes a central distributor and the inlet stubs are connected with the central distributor.

5. The apparatus as claimed in claim 4, wherein the inlet stubs and the upper part of the liquid degassing means are disposed exteriorly of the container.

6. The apparatus as claimed in claim 1, wherein said at least one of the bundle of pipes or pack of plates of the liquid degassing means are at an angle of 30°-80° to the horizontal.

7. The apparatus as claimed in claim 2 wherein the feeding system means includes a central distributor and the inlet stubs are connected with the central distributor.

8. The apparatus as claimed in claim 3 wherein the feeding system means includes a central distributor and the inlet stubs are connected with the central distributor.

9. The apparatus as claimed in claim 2 wherein said at least one of the bundle of pipes or packs of plates of the liquid degassing means are at an angle of 30°-80° to the horizontal.

10. The apparatus as claimed in claim 3 wherein said at least one of the bundle of pipes or packs of plates of the liquid degassing means are at an angle of 30°-80° to the horizontal.

11. The apparatus as claimed in claim 4 wherein the said at least one of bundle of pipes or packs of plates of the liquid degassing means are at an angle of 30°-80° to the horizontal.

12. The apparatus as claimed in claim 5 wherein said at least one of the bundle of pipes or packs of plates of the liquid degassing means are at an angle of 30°-80° to the horizontal.

* * * * *